United States Patent
Boorse et al.

(10) Patent No.: US 7,998,423 B2
(45) Date of Patent: Aug. 16, 2011

(54) SCR ON LOW THERMAL MASS FILTER SUBSTRATES

(75) Inventors: Samuel Boorse, Skillman, NJ (US); Joseph C. Dettling, Howell, NJ (US)

(73) Assignee: BASF Corporation, Florham Park, NJ (US)

(*) Notice: Subject to any disclaimer, the term of this patent is extended or adjusted under 35 U.S.C. 154(b) by 715 days.

(21) Appl. No.: 12/036,019

(22) Filed: Feb. 22, 2008

(65) Prior Publication Data
US 2008/0202107 A1 Aug. 28, 2008

Related U.S. Application Data

(60) Provisional application No. 60/891,835, filed on Feb. 27, 2007.

(51) Int. Cl.
B01D 50/00 (2006.01)

(52) U.S. Cl. ......... 422/180; 422/177

(58) Field of Classification Search ......... 422/177, 422/180
See application file for complete search history.

(56) References Cited

U.S. PATENT DOCUMENTS

| | | |
|---|---|---|
| 4,220,632 A | 9/1980 | Pence et al. |
| 4,297,328 A | 10/1981 | Ritscher et al. |
| 4,440,871 A | 4/1984 | Lok et al. |
| 4,544,538 A | 10/1985 | Zones |
| 4,567,029 A | 1/1986 | Wilson et al. |
| 4,732,584 A | 3/1988 | Coe et al. |
| 4,735,927 A | 4/1988 | Gerdes et al. |
| 4,735,930 A | 4/1988 | Gerdes et al. |
| 4,861,743 A | 8/1989 | Flank et al. |
| 4,867,954 A | 9/1989 | Staniulis et al. |
| 4,874,590 A | 10/1989 | Staniulis et al. |
| 4,961,917 A | 10/1990 | Byrne |
| 5,024,981 A | 6/1991 | Speronello et al. |
| 5,041,270 A | 8/1991 | Fujitani et al. |
| 5,096,684 A | 3/1992 | Guth et al. |
| 5,233,117 A | 8/1993 | Barger |
| 5,313,792 A | 5/1994 | Katoh et al. |
| 5,417,949 A | 5/1995 | McWilliams et al. |
| 5,477,014 A | 12/1995 | Dunne et al. |

(Continued)

FOREIGN PATENT DOCUMENTS

DE 394541 A1 6/1990

(Continued)

OTHER PUBLICATIONS

International Search Report for PCT/US2008/055138 dated Aug. 8, 2008.

(Continued)

*Primary Examiner* — Tom Duong
(74) *Attorney, Agent, or Firm* — Scott S. Servilla; Diehl Servilla LLC; Melanie L. Brown

(57) ABSTRACT

Provided are selective catalytic reduction (SCR) filters that effectively provide simultaneous treatment of particulate matter and $NO_x$. Provided also are methods for reducing $NO_x$ concentration and particulate matter in a diesel engine exhaust by using the SCR filters. The SCR filter can include a fiber matrix wall flow filter comprising a plurality of non-woven inorganic fibers and a chabazite molecular sieve SCR catalyst on the fiber matrix wall flow filter. By combining a fiber matrix wall flow filter with a chabazite molecular sieve SCR catalyst, high catalyst loading can be achieved without causing excessive back pressure across the filter when implemented in emission treatment systems.

20 Claims, 4 Drawing Sheets

U.S. PATENT DOCUMENTS

| | | | |
|---|---|---|---|
| 5,516,497 | A | 5/1996 | Speronello et al. |
| 5,529,686 | A | 6/1996 | Hagen et al. |
| 5,589,147 | A * | 12/1996 | Farnos et al. ............... 423/239.2 |
| 5,589,149 | A | 12/1996 | Garland et al. |
| 5,884,473 | A | 3/1999 | Noda et al. |
| 6,139,808 | A | 10/2000 | Mizuno et al. |
| 6,162,415 | A | 12/2000 | Liu et al. |
| 6,171,556 | B1 | 1/2001 | Burk et al. |
| 6,316,683 | B1 | 11/2001 | Janssen et al. |
| 6,319,487 | B1 | 11/2001 | Liu et al. |
| 6,350,298 | B1 | 2/2002 | Su et al. |
| 6,376,562 | B1 | 4/2002 | Ihm et al. |
| 6,395,674 | B1 | 5/2002 | Fung et al. |
| 6,503,863 | B2 | 1/2003 | Fung et al. |
| 6,569,394 | B2 | 5/2003 | Fischer et al. |
| 6,576,203 | B2 | 6/2003 | Abe et al. |
| 6,606,856 | B1 | 8/2003 | Brown et al. |
| 6,685,905 | B2 | 2/2004 | Mertens et al. |
| 6,696,032 | B2 | 2/2004 | Mertens et al. |
| 6,709,644 | B2 | 3/2004 | Zones et al. |
| 6,974,889 | B1 | 12/2005 | Verduijn et al. |
| 7,014,827 | B2 | 3/2006 | Mertens et al. |
| 7,049,261 | B2 | 5/2006 | Nam et al. |
| 7,094,389 | B2 | 8/2006 | Cao et al. |
| 7,229,597 | B2 | 6/2007 | Patchett et al. |
| 7,566,426 | B2 * | 7/2009 | Zuberi ........................ 422/180 |
| 7,601,662 | B2 | 10/2009 | Bull et al. |
| 2001/0038812 | A1 | 11/2001 | Yavuz et al. |
| 2001/0043896 | A1 | 11/2001 | Domesle et al. |
| 2002/0016252 | A1 | 2/2002 | Takahashi et al. |
| 2003/0069449 | A1 | 4/2003 | Zones et al. |
| 2004/0098973 | A1 | 5/2004 | Tennison et al. |
| 2004/0166035 | A1 | 8/2004 | Noda et al. |
| 2004/0171476 | A1 | 9/2004 | Nam et al. |
| 2004/0209760 | A1 | 10/2004 | Yoshikawa |
| 2005/0031514 | A1 | 2/2005 | Patchett et al. |
| 2005/0096214 | A1 | 5/2005 | Janssen et al. |
| 2006/0039843 | A1 | 2/2006 | Patchett et al. |
| 2006/0115403 | A1 | 6/2006 | Yuen |
| 2007/0000243 | A1 | 1/2007 | Liu et al. |
| 2007/0043249 | A1 | 2/2007 | Cao et al. |
| 2007/0149385 | A1 | 6/2007 | Liu et al. |
| 2007/0286798 | A1 | 12/2007 | Cao et al. |
| 2008/0241060 | A1 | 10/2008 | Li et al. |
| 2008/0250775 | A1 | 10/2008 | Bruck |
| 2008/0317999 | A1 | 12/2008 | Patchett et al. |
| 2009/0060809 | A1 | 3/2009 | Shioya et al. |
| 2010/0267548 | A1 | 10/2010 | Andersen et al. |

FOREIGN PATENT DOCUMENTS

| | | |
|---|---|---|
| DE | 10059520 | 5/2001 |
| EP | 0234441 A2 | 9/1987 |
| EP | 0396085 | 11/1990 |
| EP | 0624393 A1 | 11/1994 |
| EP | 0773057 A1 | 5/1997 |
| EP | 0950800 A2 | 10/1999 |
| EP | 1837489 A1 | 9/2007 |
| JP | 6-48725 | 2/1994 |
| JP | 05-057194 | 9/1994 |
| WO | WO-99/56859 | 11/1999 |
| WO | 02066152 | 8/2002 |
| WO | WO-03/035549 A1 | 5/2003 |
| WO | WO-2007/004774 A1 | 1/2007 |
| WO | WO-2007/005308 A2 | 1/2007 |
| WO | WO-2008/019585 A1 | 2/2008 |
| WO | WO-2008/118434 A1 | 10/2008 |
| WO | WO-2008/132452 A2 | 11/2008 |

OTHER PUBLICATIONS

Written Opinion for PCT/US2008/055138 dated Aug. 8, 2008.
"Chinese Journal of Catalysis", *Thermal and Hydrothermal Stability of SAPO-34 Molecular Sieve*, vol. 17, No. 6 Nov. 1996, 9 pgs.
Final Office Action in U.S. Appl. No. 12/280,360, dated Jul. 26, 2010, 11 pgs.
"Fourth International Congress on Catalysis and Automotive Pollution Control", Apr. 1997, 7.
Gabriele Centi Declaration of Sep. 22, 2010, 11 pgs.
Machine Translation from EPO of DE 394541 A1, 8 pgs., Jun. 13, 1990.
Non-Final Office Action in U.S. Appl. No. 12/361,980, mailed Sep. 22, 2010, 26 pgs.
Non-Final Office Action, dated Feb. 26, 2010 in U.S. Appl. No. 12/480,360, 19 pgs.
PCT International Search Report and Written Opinion in PCT/US2009/032610, Jul. 16, 2009, 20 pgs.
PCT International Search Report and Written Opinion for PCT/US2008/055140, 11, Nov. 8, 2008.
Reexam Order in Pat. No. 7,601,662, 18 pgs., Oct. 13, 2009.
Reexamination Request in Pat. No. 7,601,662, 35 pgs., Oct. 13, 2009.
Request for Inter Partes Reexamination, dated Sep. 28, 2010, 77 pgs.
Non-Final Office Action mailed Jan. 13, 2009 for U.S. Appl. No. 12/038,423, filed mailed Jan. 13, 2009, 16 pgs.
Akolekar, Deepak B. et al., "FTIR investigations of the adsorption and disproportionation of NO on Cu-exchanged silicoaluminophosphate of type 34", *J. Chem. Soc., Faraday Trans.*, 94(1) 1998, 155-160.
Amiridis, Michael D. et al., "Selective catalytic reduction of nitric oxide by hydrocarbons", *Applied Catalysis* 1996, 203-227 pgs.
Ashtekar, Sunil et al., "Small-Pore Molecular Sieves SAPO-34 and SAPO-44 with Chabazite Structure: A Study of Silicon Incorporation", *J. Phys. Chem. 1994, 98* 1994, 4878-4883.
Baerlocher, CH. et al., "Atlas of Zeolite Framework Types", *Elsevier—Fifth Revised Edition* 2001, 5 pages.
Barger, Paul T. et al., "Hydrothermal Stability of SAPO-34 in the Methanol-to-Olefins Process", *Tha Arabian Journal for Science and Engineering*, vol. 21, No. 2 Apr. 10, 1996.
Barthomeuf, Denise, "Journal: NATO ASI Series, Series C: Mathematical and Physical Sciences Issue 444", *Generation of acidity (amount and strength) in siliconaluminophosphates (SAPO zeolites), Examples of SAPO-5*; pp. 375-390 1994, 17 pgs.
Breck, Donald W., "Zeolite Molecular Sieves", *John Wiley & Sons, A Wiley-Interscience Publication* 1974, 6 pgs.
Centi, G. et al., "Role of the Nature of Copper Sites in the Activity of Copper-Based Catalysts for NO Conversion", *Research on Chemical Intermediates, 17* 1992, 125-135 pgs.
Chen, Jiesheng et al., "Silicoaluminophosphate number eighteen (SAPO-18): a new mircoporous solid acid catalyst", *Catalysis Letters 28* 1994, 241-248.
Chung, Sung Y. et al., "Effect of Si/Alratio of Mordenite and ZSM-5 type Zeolite Catalysts on Hydrothermal Stability for NO Reduction by Hydrocarbons", *Studies in Surface Science Catalysis, vol. 130* 2000, 1511-1516.
Dedecek, Jiri et al., "Effect of Framework Charge Density on Catalytic Activity of Copper Loaded Molecular Sieves of Chabazite Structure in Nitrogen (II) Oxide Decomposition", *Collect. Czech. Chem. Commun.* (vol. 65) 2000, 343-351 pgs.
Dedecek, J. et al., "Siting of the Cu+ ions in dehydrated ion exchanged synthetic and natural chabasites: a Cu+ photoluminescence study", *Microporous and Mesoporous Materials 32* 1999, 12 pgs.
Frache, A. et al., "Catalytic DeNOx activity of cobalt and copper ions in microporous MeALPO-34 and MeAPSO-34", *Catalysis Today 75* 2002, 359-365.
Frache, A. et al., "CuAPSO-34 catalysts for N2O decomposition in the presence of H2O. A study of zeolite structure stability in comparison to Cu-SAPO-34 and Cu-ZSM-5", *Topics in Catalysis* vol. 22, Nos. 1/2 2003, 5.
Frache, A. et al., "Spectroscopic characterisation of microporous aluminophosphate materials with potential application in environmental catalysis", *Catalysis Today 77* 2003, 371-384.
Frache, A. et al., "Synthesis, Spectroscopic and Catalytic Properties of Cobalt and Copper Ions in Aluminophosphates with Chabasite-Like Structure, Studies of the NO Reactivity", *Studies in Surface Science and Catalysis 140* 2001, 269-277.
Hartmann, Martin et al., "Transition-Metal Ions in Aluminophosphate and Silicoaluminophosphate Molecular Sieves: Location, Interaction with Adsorbates and Catalytic Properties", *Chem. Rev. 99* (3) 1999, 635-663.
Heck, Ronald M. et al., "Catalytic Air Pollution Control", *A John Wiley & Sons, Inc., Publication—Wiley-Interscience* 2002, 3 pgs.

Ishihara, Tatsumi et al., "Copper Ion Exchanged Silicoaluminophosphate (SAPO) as a Thermostable Catalyst for Selective Reduction of NOx with Hydrocarbons", *Studies in Surface Science and Catalysis,* vol. 84 (1994) 1994, 1493-1500.

Ishihara, Tatsumi et al., "Copper Ion-Exchanged SAPO-34 as a Thermostable Catalyst for Selective Reduction of NO with C3H6", *Journal of Catalysis*, vol. 169 1997, 10 pgs.

Ishihara, Tatsumi et al., "Selective Reduction of Nitrogen Monoxide with Propene over Cu-Silico-aluminophosphate (SAPO) under Oxidizing Atmosphere", *The Chemical Society of Japan* (1992), 2119-2122.

Ishihara, Tatsumi et al., "Thermostable Molecular Sieves, Silicoaluminophosphate (SAPO)-34, for the Removal of NOx with C3H6 in the Coexistence of O2, H2O, and SO2", *Ind. Eng. Chem. Res.*, 36 1997, 17-22.

Kwak, JA H. et al., "Excellent activity and selectivity of Cu-SSZ-13 in the selective catalytic reduction of NOx with NH3", *Journal of Catalysis* 2010, 4 pgs.

Li, Yuejin et al., "Selective NH3 Oxidation to N2 in a Wet Stream", *Applied Catalysis B: Environmental 13* 1997, 131-139.

Lok, B. M. et al., "Silicoaluminophosphate Molecular Sieves: Another New Class of Microporous Crystalline Inorganic Solids", *Journal of the American Chemical Society*, vol. 106 1984, 6092-6093.

Marchese, L. et al., "ALPO-34 and SAPO-34 synthesized by using morpholine as templating agent. FTIR and FT-Raman studies of the host-guest and guest-guest interactions within the zeolitic framework", *Microporous and Mesoporous Materials 30* 1999, 145-153.

Medros, F. G. et al., "Dual-Catalyst System to Broaden the Window of Operability in the Reduction of NOx with Ammonia", *Ind. Eng. Chem. Res. 28* 1989, 1171-1177.

Miller, William R. et al., "Urea selective catalytic reduction", *2010 Factiva, Inc.* 2000, 9 pgs.

Misono, Makoto, "Catalytic reduction of nitrogen oxides by bifunctional catalysts", *Baltzer Science Publishers* vol. 2, No. 2 Dec. 1998, 24 pgs.

Palella, B. I. et al., "On the hydrothermal stability of CuAPSO-34 mircoporous catalysts for N2O decomposition: a comparison with CuZSM-5", *Journal of Catalysis 217* 2003, 100-106.

Prakash, A M. et al., "Synthesis of SAPO-34: High Silicon Incorporation in the Presence of Morpholine as Template", *J. Chem. Soc. Faraday Trans. 1994*, 90(15) 1994, 2291-2296.

Rebrov, E. V. et al., "Development of the Kinetic Model of Platinum Catalyzed Ammonia Oxidation in a Microreactor", *Chemical Engineering Journal 90* 2002, 61-76.

Torre-Abreu, C. et al., "Selective Catalytic Reduction of NO on Copper-Exchanged Zeolites: The Role of the Structure of the Zeolite in the Nature of Copper-Active Sites", *Catalysis Today 54* 1999, 407-418.

Treacy, M.M. J. et al., "Proceedings of the 12th International Zeolite Conference", *Materials Research Society Conference Proceedings IV* Jul. 5-10, 1998, 6.

Uzunova, Ellie L. et al., "Adsorption of NO on Cu-SAPO-34 and Co-SAPO-34; A Periodic DFT Study", *J. Phys. Chem C 2008* 2008, 2632-2639.

Watanabe, Yoshihide et al., "Multinuclear NMR Studies on the Thermal Stability of SAPO-34", *Journal of Catalysis* 1993, 430-436 pgs.

Zelenka, P. et al., "Exhaust gas aftetreatment systems for diesel engines with respect to future emission legislation", *Diesel Engine Technology 96* May 1993, 13 pgs.

* cited by examiner

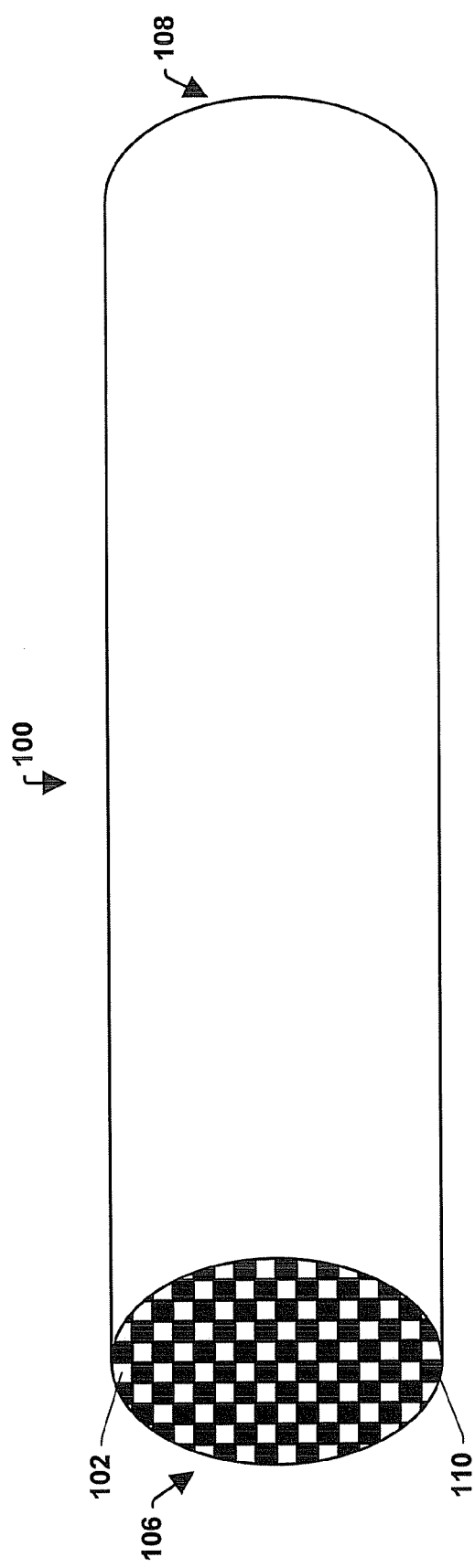

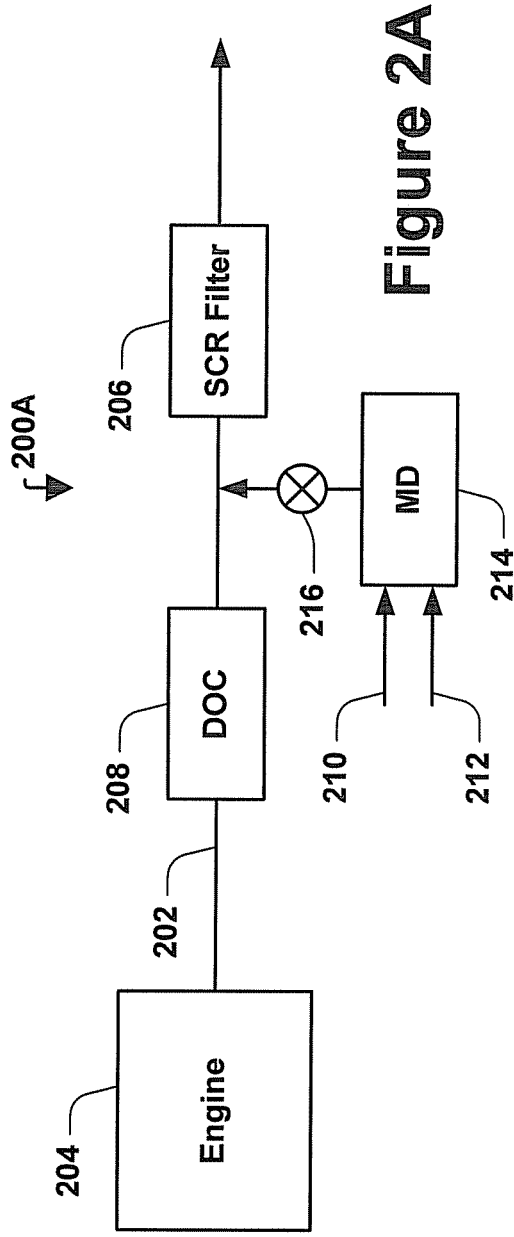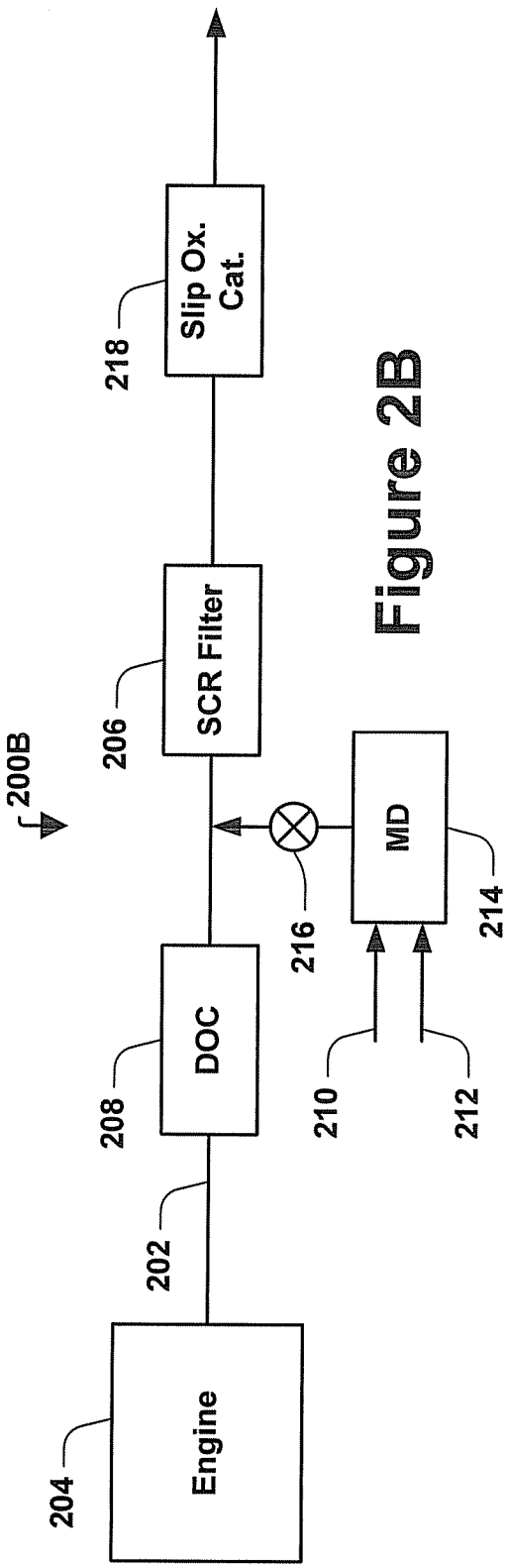

SCR ON LOW THERMAL MASS FILTER SUBSTRATES

RELATED APPLICATIONS

This application claims priority to U.S. Provisional Patent Application 60/891,835 filed on Feb. 27, 2007, entitled COPPER CHA ZEOLITE CATALYSTS, which is hereby incorporated by reference.

BACKGROUND

Over many years harmful components of nitrogen oxides ($NO_x$) have caused atmospheric pollution. $NO_x$ is contained in exhausted gases such as from internal combustion engines (e.g., automobiles and trucks), from combustion installations (e.g., power stations heated by natural gas, oil, or coal), and from nitric acid production plants.

Different methods have been used in the treatment of $NO_x$-containing gas mixtures. One type of treatment involves catalytic reduction of nitrogen oxides. There can be two processes: (1) a nonselective reduction process wherein carbon monoxide, hydrogen, or a lower hydrocarbon is used as a reducing agent, and (2) a selective reduction process wherein ammonia or ammonia precursor is used as a reducing agent. In the selective reduction process, a high degree of removal with nitrogen oxide can be obtained with a small amount of reducing agent.

The selective reduction process is referred to as SCR process (Selective Catalytic Reduction). The SCR process uses catalytic reduction of nitrogen oxides with ammonia in the presence of atmospheric oxygen with the formation predominantly of nitrogen and steam:

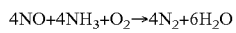

$$4NO + 4NH_3 + O_2 \rightarrow 4N_2 + 6H_2O$$

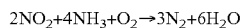

$$2NO_2 + 4NH_3 + O_2 \rightarrow 3N_2 + 6H_2O$$

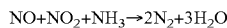

$$NO + NO_2 + NH_3 \rightarrow 2N_2 + 3H_2O$$

A diesel engine exhaust contains phase materials (liquids and solids) which constitute particulates or particulate matter as well as $NO_x$. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter, and a catalyst for the reduction of $NO_x$.

The particulate matter emissions of diesel exhaust contain three main components. One component is a solid, dry, solid carbonaceous fraction or soot fraction. This dry carbonaceous matter contributes to the visible soot emissions commonly associated with diesel exhaust. A second component of the particulate matter is a soluble organic fraction ("SOF"). The soluble organic fraction is sometimes referred to as a volatile organic fraction ("VOF"). The VOF can exist in diesel exhaust either as a vapor or as an aerosol (fine droplets of liquid condensate) depending on the temperature of the diesel exhaust. The VOF arises from two sources: (1) lubricating oil swept from cylinder walls of the engine each time the pistons go up and down; and (2) unburned or partially burned diesel fuel. A third component of the particulate matter is a sulfate fraction. The sulfate fraction is formed from small quantities of sulfur components present in the diesel fuel. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of total particulate matter.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation described herein relates to selective catalytic reduction (SCR) filters that effectively provide simultaneous treatment of particulate matter and $NO_x$. The subject innovation also relates to emission treatment systems and emission treatment methods that involve the SCR filter. The SCR filter can include a fiber matrix wall flow filter comprising a plurality of non-woven inorganic fibers and a chabazite molecular sieve SCR catalyst on the fiber matrix wall flow filter. By combining a fiber matrix wall flow filter with a chabazite molecular sieve SCR catalyst, which is an SCR catalyst with the chabazite structure, a high catalyst loading can be achieved without causing excessive back pressure across the filter when implemented in emission treatment systems.

The subject innovation also relates to methods for reducing $NO_x$ concentration and particulate matter in a diesel engine exhaust. In accordance with one aspect of the claimed subject matter, the method involves injecting ammonia or an ammonia precursor a diesel engine exhaust, and passing the exhaust through a SCR filter containing a fiber matrix wall flow filter and a chabazite molecular sieve SCR catalyst on the fiber matrix wall flow filter, the fiber matrix wall flow filter containing a plurality of non-woven inorganic fibers.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIG. 1A is a perspective view of a fiber matrix wall flow filter in accordance with one aspect of the specification.

FIGS. 2A and 2B are schematic diagrams illustrating systems for treating an exhaust stream containing $NO_x$ and particulate matter in accordance with one aspect of the specification.

DETAILED DESCRIPTION

Figure 1B:
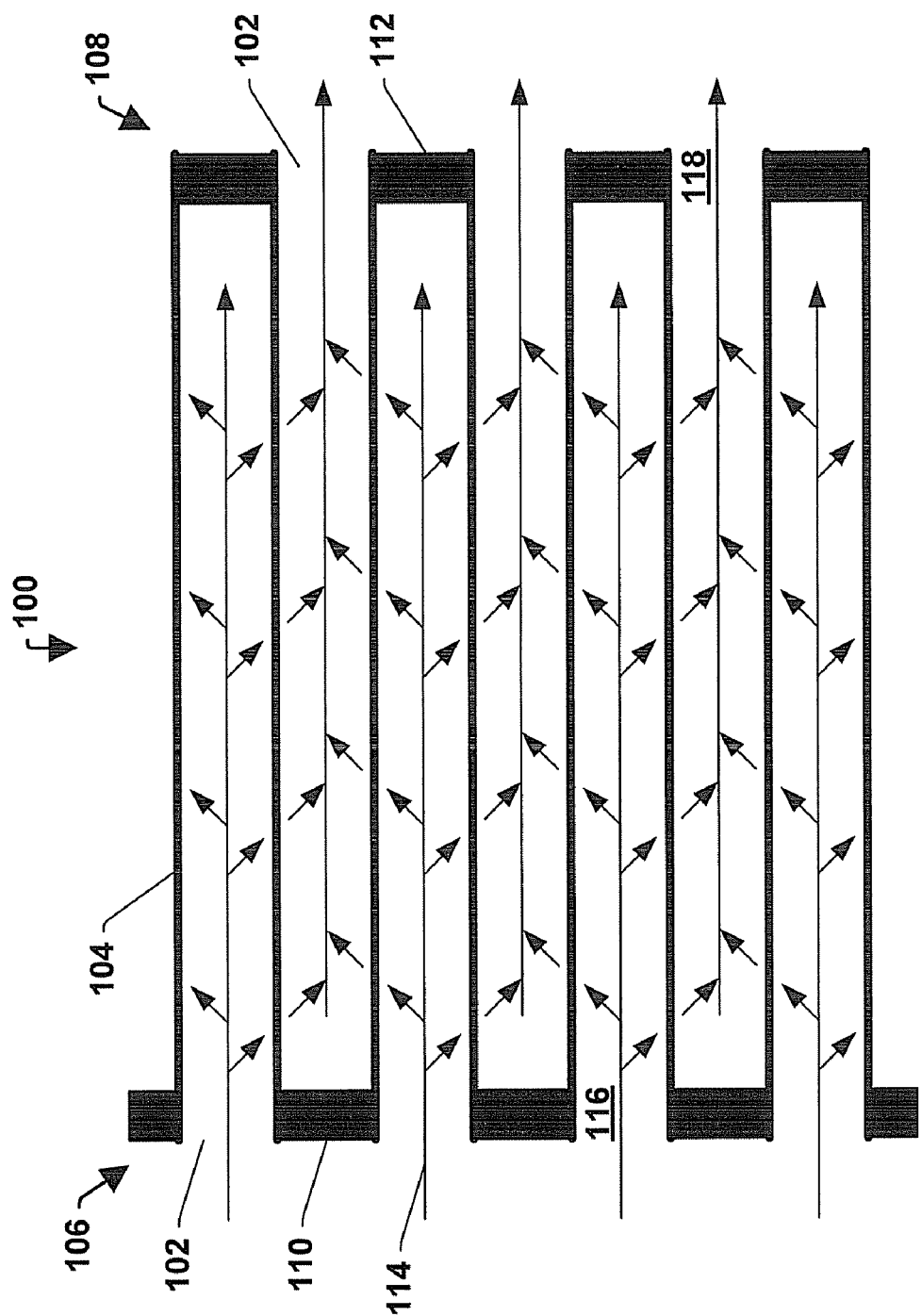
FIG. 1B is a cutaway view of a portion of a fiber matrix wall flow filter in accordance with one aspect of the specification.

The subject innovation described herein relates to selective catalytic reduction (SCR) filters, emission treatment systems, emission treatment methods that effectively provide simultaneous treatment of particulate matter and $NO_x$. Integration of $NO_x$ reduction and particulate removal functions into a single catalyst article can be accomplished by using a fiber matrix wall flow filter coated with a chabazite molecular sieve SCR catalyst. The emission treatment system uses an integrated soot filter and SCR catalyst to significantly minimize the weight and volume required for the emissions system. Moreover, due to the choice of catalytic compositions implemented in the system, effective pollutant abatement can be provided for exhaust streams of varying temperatures. This feature is advantageous for operating diesel engines under varying loads and engine speeds which have a significant impact on exhaust temperatures emitted from the engines.

The subject innovation can be used in an application where high filtration efficiency is required. For example, the SCR filter is suitable for effectively removing particulate matter in emission treatment systems. The combination of a fiber matrix wall flow filter and a chabazite molecular sieve SCR catalyst disclosed herein allows wall flow substrates to be loaded with practical levels of the SCR catalyst without causing excessive back pressure across the coated filter when implemented in emission treatment systems.

Compared to conventional emission treatment techniques, improved flexibility in emission treatment system configuration and lower fuel costs associated with active regeneration of the system can be achieved by a combination of a fiber matrix wall flow filter having low thermal mass and a hydrophobic chabazite molecular sieve as a SCR catalyst. By coating the filter with the chabazite molecular sieve SCR catalyst, the lower thermal mass of the filter can provide faster light-off, better conversions at low temperature for $NO_x$ control by the SCR reaction, and high temperature stability.

The filter contains fused fiber bundles to form a wall flow depth filter. This structure generates high porosity while achieving good filtration efficiency. Even after coating the SCR catalyst on the filter wall, there is substantially no negative interaction of the coating with the substrate to adversely affect the physical properties. The matrix structure with the high loading of SCR coating indicates only a minimal increase in back pressure over the uncoated substrate.

$NO_x$ is reduced with ammonia ($NH_3$) to nitrogen ($N_2$) over the SCR catalyst. Urea is typically used to form ammonia. The filter can provide efficient mixing of urea with the catalyst. By improving the mixing of the urea and the SCR catalyst within the fiber matrix body, hydrolysis of the urea proceeds faster, thereby enabling $NH_3$ to be made more readily for reaction with the $NO_x$.

The fiber matrix wall flow filter can contain a plurality of non-woven inorganic fibers. The non-woven inorganic fibers can be any suitable fiber as long as the fibers can have thermal tolerance under emission treatment processes. The non-woven inorganic fibers can have one or more properties of a high melting point, low heat conductance, low coefficient of thermal expansion, ability to withstand thermal and vibrational shock, low density, and high porosity and permeability. Thus, the fiber matrix wall flow filter containing the non-woven inorganic fibers can have one or more properties of a high melting point, low heat conductance, low coefficient of thermal expansion, an ability to withstand thermal and vibrational shock, a low density, a high porosity, and a high permeability.

General examples of non-woven inorganic fibers include alumina fibers, silica fibers, mullite fibers, silicon carbide fibers, aluminosilicate fibers, aluminum borosilicate fibers, or the like. The alumina fibers typically contain about 95 wt. % or more and about 97 wt. % or less of alumina and about 3 wt. % or more and about 5 wt. % or less of silica in a fibrous form.

The alumina fibers can be produced by extruding or spinning a solution of precursor species.

The silica fibers typically contain about 90 wt. % or more of amorphous silica with low impurity levels. In one embodiment, silica fibers has a low density (e.g., about 2.1 $g/cm^3$ or more and about 2.2 $g/cm^3$ or less), high refractoriness (about 1600 degrees Celsius), low thermal conductivity (about 0.1 W/m-K), and near zero thermal expansion.

The aluminosilicate fibers typically contain about 40 wt. % or more and about 80 wt. % or less of alumina, about 5 wt. % or more and about 25 wt. % or less of silica, and about 0 wt. % or more and about 20 wt. % of iron or magnesium oxides The aluminum borosilicate fibers typically contain about 40 wt. % or more and about 80 wt. % or less of alumina, about 5 wt. % or more and about 25 wt. % or less of silica, and about 1 wt. % or more and about 30 wt. % of boric oxide or boron oxide. The details of the aluminum borosilicate fibers can be found in, for example, U.S. Pat. No. 3,795,524, which is hereby incorporated by reference.

The fibers can have any suitable average fiber diameter for forming the monolithic honeycomb structure of the fiber matrix wall flow filter. In one embodiment, the fibers have about 0.5 microns or more and about 50 microns or less of average fiber diameter. In another embodiment, the fibers have about 0.7 microns or more and about 30 microns or less of average fiber diameter. In yet another embodiment, the fibers have about 1 micron or more and about 20 microns or less of average fiber diameter.

The fibers can have any suitable average tensile strength for forming the monolithic honeycomb structure of the fiber matrix wall flow filter. In one embodiment, the fibers have an average tensile strength greater than about 700 MPa (100,000 psi). In another embodiment, the fibers have an average tensile strength greater than about 1,200 MPa (200,000 psi). In yet another embodiment, the fibers have an average tensile strength greater than about 1,800 MPa (300,000 psi). In still yet another embodiment, the fibers have an average tensile strength greater than about 2,100 MPa (350,000 psi).

The fiber matrix wall flow filter can contain alumina fibers, silica fibers, mullite fibers, silicon carbide fibers, aluminosilicate fibers, aluminum borosilicate fibers, or the like at suitable weight percentage. In one embodiment, the inorganic fiber portion of the filter contains from about 50 wt. % or more to about 90 wt. % or less of silica fibers, from about 5 wt. % or more to about 50 wt. % or less of alumina fibers, and from about 10 wt. % or more to about 25 wt. % or less of aluminum borosilicate fibers.

In one embodiment, the fiber matrix wall flow filter further contains additives such as binding agents and thickening agents. Organic binders and inorganic binders such as boron binders (e.g., boron nitride) can be added. Alternatively, boron nitride can be added to replace aluminum borosilicate fibers. For example, the filter contains silica fiber, alumina fiber, and boron nitride in similar weight percentage as described above.

In one embodiment, the filter contains low density fused fibrous ceramic composites prepared from amorphous silica and/or alumina fibers with about 2 to about 12% boron nitride fibers by weight. The details of the low density fused fibrous ceramic composites can be found in, for example, U.S. Pat. No. 5,629,186, which is hereby incorporated by reference.

The monolithic honeycomb structure of the fiber matrix wall flow filter can be formed by any suitable technique. In one embodiment, the filter is formed by forming a blank via sol-gel techniques and forming holes or cells via drilling in the blank. In another embodiment, the filter is formed by extrusion techniques. The details of the manufacture of filters are not critical to the subject innovation. The details of the manufacture of filters can be found in, for example, U.S. Patent Application Publication No. 2004/0079060, which is hereby incorporated by reference.

The fiber matrix wall flow filter can have a relatively low thermal mass, which in turn can contribute to faster heating and shorter light-off times. Since the fiber matrix wall flow filter can be quickly heated to the catalyst activation temperature, catalysts on the filter can quickly begin to convert $NO_x$ in the exhaust gas into $N_2$.

The fiber matrix wall flow filter can have a low coefficient of thermal expansion between about 200 degrees Celsius and about 800 degrees Celsius (CTE 200-800). In one embodiment, the filter with or without a coating of a SCR catalyst has a CTE 200-800 of about $1 \times 10^{-6}$/degree Celsius or more and about $6 \times 10^{-6}$/degree Celsius or less. In another embodiment, the filter with or without a coating of a SCR catalyst has a CTE 200-800 of about $2 \times 10^{-6}$/degree Celsius or more and about $4.5 \times 10^{-6}$/degree Celsius or less. In yet another embodiment, the filter with or without a coating of a SCR catalyst has a CTE 200-800 of about $3 \times 10^{-6}$/degree Celsius or more and about $4 \times 10^{-6}$/degree Celsius or less.

The fiber matrix wall flow filter can also have a low coefficient of thermal expansion between about 900 degrees Celsius and about 500 degrees Celsius (CTE 900-500). In one embodiment, the filter with or without a coating of a SCR catalyst has a CTE 900-500 of about 200 ppm or more and about 1500 ppm or less. In another embodiment, the filter with or without a coating of a SCR catalyst has a CTE 900-500 of about 300 ppm or more and about 1000 ppm or less. In yet another embodiment, the filter with or without a coating of a SCR catalyst has a CTE 900-500 of about 350 ppm or more and about 500 ppm or less.

The fiber matrix wall flow filter can have an elastic or Young's modulus, Emod. The Emod of the wall flow filter can be measured at room temperature or at elevated temperature from 200 to 1000° C., for example. In one embodiment, the room temperature Emod values can range from about 0.9 to about 1.2 Mpsi for an uncoated fiber wall flow filter material. In another embodiment, the fiber filter material can have a room temperature Emod value of about 0.8 to about 1.4 when coated.

The fiber matrix wall flow filter can have a modulus of rupture strength (MOR). In one embodiment, the filter with or without a coating of a SCR catalyst has a MOR of about 1,000 psi or more and about 2,000 psi or less when measured at room temperature in a typical four point bending test in a manner similar to ASTM C1161-02c. In another embodiment, the filter with or without a coating of a SCR catalyst has a MOR of about 1,000 psi or more and about 1,800 psi or less. In yet another embodiment, the filter with or without a coating of a SCR catalyst has a MOR of about 1,000 psi or more and about 1,500 psi or less.

The fiber matrix wall flow filter can have a thin porous walled honeycomb structure through which a fluid stream passes without causing a great increase in back pressure or pressure across the filter. The filter can have any suitable honeycomb cell density. In one embodiment, the honeycomb cell density is about 100 cell/in$^2$ or more and about 400 cell/in$^2$ or less. In another embodiment, the honeycomb cell density of the filter is about 200 cell/in$^2$ or more and about 300 cell/in$^2$ or less. The honeycomb cell shape can be square, triangle, round, oval, pentagonal, Hepa, doughnut, or the like. The inlet channel can be larger than outlets to reduce back-pressure generation and ash storage capacity. The wall thickness of the honeycomb structure can be about 10 mils or more and about 40 mils or less. In another embodiment, the wall thickness of the honeycomb structure can be about 20 mils or more and about 30 mils or less. The porosity of the wall of the honeycomb structure can be about 60% or more and about 90% or less. In another embodiment, the porosity of the wall of the honeycomb structure is about 70% or more and about 85% or less. In yet another embodiment, the porosity of the wall of the honeycomb structure is about 55% or more and about 70% or less. The pore size can be about 15 microns or more and about 100 microns or less. In one embodiment, the pore size can be about 15 microns or more and about 30 microns or less.

Any fiber matrix wall flow filter having the above mentioned properties can be suitable for use in the practices of the subject innovation. Specific examples of such fiber matrix wall flow filter can be found in, for example, U.S. Patent Application Publication Nos. 2004/0079060, 2005/0042151, 2006/0120937, 2007/0104621, 2007/0104622, 2007/0104620, 2007/0151799, 2007/0151233, 2007/0107395, 2007/0152364, 2007/0111878, 2007/0141255, 2007/0107396, 2007/0110645, 2007/0108647, 2007/0220871, 2007/0207070, and 2007/0104632, which are hereby incorporated by reference.

A molecular sieve can be zeolitic—zeolites—or non-zeolitic, and zeolitic and non-zeolitic molecular sieves can have the chabazite crystal structure, which is also referred to as the CHA structure by the International Zeolite Association. Zeolitic chabazite include a naturally occurring tectosilicate mineral of a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference.

Synthesis of another synthetic form of zeolitic chabazite, SSZ-13, is described in U.S. Pat. No. 4,544,538, which is hereby incorporated by reference, by using N-alkyl-3-quinuclidinol, N,N,N-tri-alkyl-1-adamantylammonium cations and/or N,N,N-trialkyl-exoaminonorbornane as a directing agent in a conventional OH-medium. SSZ-13 typically contains a silica to alumina molar with a ratio of about 8 to about 50. The molar ratios can be adjusted by varying the relative ratios of the reactants in the synthesis mixture and/or by treating the zeolite with chelating agents or acids to remove aluminum from the zeolite lattice. The crystallization of SSZ-13 can be accelerated and the formation of undesirable contaminants can be reduced by adding seeds of SSZ-13 to the synthesis mixture.

Synthesis of a synthetic form of a non-zeolitic molecular sieve having the chabazite crystal structure, silicoaluminophosphate 34 (SAPO-34) and SAPO-37, is described in U.S. Pat. No. 7,264,789, which is hereby incorporated by reference, by using a colloidal suspension of seeds to crystallize the chabazite structures. A method of making yet another synthetic no-zeolitic molecular sieve having chabazite structure, SAPO-44, is described in U.S. Pat. No. 6,162,415, which is hereby incorporated by reference. These zeolitic and nonzeolitic molecular sieves having the chabazite structure, SSZ-13, SAPO-34, and SAPO-44 can be employed as a SCR catalyst in the subject innovation.

Chabazite molecular sieves can be hydrophobic. Hydrophobic chabazite molecular sieve means that the chabazite molecular sieve is hydrophobic in and of itself, or that the chabazite molecular sieve is a hydrophilicchabazite molecular sieve that is rendered hydrophobic by application of an outer coating of a suitable hydrophobic wetting agent (e.g., the particulate material has a hydrophilic core and a hydrophobic outer surface).

The surfaces of chabazite molecular sieves can be made hydrophobic by contact with hydrophobic wetting agents. Any suitable mineral applications, especially in organic systems such as plastic composites, films, organic coatings, or rubbers, can be employed to render the chabazite molecular sieve surface hydrophobic. The details of the mineral applications are described in, for example, Jesse Edenbaum, Plastics Additives and Modifiers Handbook, Van Nostrand Reinhold, New York, 1992, pages 497-500, which is hereby incorporated by reference for teachings of surface treatment materials and their application.

General examples of surface treatment materials include coupling agents such as fatty acids and silanes. Specific examples of hydrophobic agents include: organic titanates such as Tilcom® obtained from Tioxide Chemicals; organic zirconate or aluminate coupling agents obtained from Kenrich Petrochemical, Inc.; organofunctional silanes such as Silquest® products obtained from Witco or Prosil® products obtained from PCR; modified silicone fluids such as the DM-Fluids obtained from Shin Etsu; and fatty acids such as Hystrene® or Industrene® products obtained from Witco Corporation or Emersol® products obtained from Henkel Corporation. In one embodiments fatty acids and salts thereof (e.g., stearic acid and stearate salts) are employed to render a particle surface of chabazite molecular sieves hydrophobic.

The hydrophobicity refers to the physical property of a surface of the chabazite molecular sieve to dislike or repel water. Hydrophobicity can be described by using contact angle measurements. The contact angle is defined by equilibrium forces that occur when a liquid sessile drop is placed on a smooth surface. The tangent to the surface of the convex liquid drop at the point of contact among the three phases, solid (S), liquid (L), and vapor (V) is the contact angle $\theta$.

The relationship between the surface tension of the solid-vapor ($\gamma_{SV}$), liquid-vapor ($\gamma_{LV}$), and solid-liquid ($\gamma_{SL}$) can be defined by the following Young's equation:

$$F = \gamma \rho \cos \theta$$

where F=wetting force; $\gamma$=liquid surface tension; and $\rho$=wetting perimeter.

If the water droplet spreads out on the surface, the contact angle is less than 90 degrees and the surface is hydrophilic. If the surface is hydrophobic then the contact angle is greater than 90 degrees. Thus, 180 degrees is the maximum hydrophobicity that a surface can have.

Many surfaces change their surface energy upon contact with water. Dynamic contact angle measurements provide both an advancing and receding contact angles. The advancing contact angle is a measurement of the surface hydrophobicity upon initial contact with a liquid, while the receding contact angle measures the hydrophobicity after the surface has been wetted with a liquid. Thus, in one embodiment, for the purposes of the subject innovation, "hydrophobic" or "hydrophobicity," when used in reference to chabazite molecular sieve, chabazite molecular sieve particles have an advancing and/or receding contact angle of about 90 degrees or more. In another embodiment, chabazite molecular sieve particles have an advancing and/or receding contact angle of about 100 degrees or more. In yet another embodiment, chabazite molecular sieve particles have an advancing and/or receding contact angle of about 110 degrees or more. In still yet another embodiment, chabazite molecular sieve particles have an advancing and/or receding contact angle of about 120 degrees or more.

In one embodiment, chabazite molecular sieve particles have a receding contact angle of about 90 degrees or more. In another embodiment, chabazite molecular sieve particles have a receding contact angle of about 100 degrees or more In yet another embodiment, chabazite molecular sieve particles have a receding contact angle of about 10 degrees or more. In still yet another embodiment, chabazite molecular sieve particles have a receding contact angle of about 120 degrees or more.

The dynamic contact angles are based on a gravimetric principle of the Wilhelmy plate technique and are determined by measurement on a Dynamic Contact Angle Instrument which can measure both advancing and receding contact angles of powdered samples. A dynamic contact angle analysis system (model DCA 315) from ATI Cahn Instruments Inc. can be used for contact angle measurements. The surface tension ($\gamma$) of deionized water is determined with a standard platinum calibration plate. Powder samples are deposited on dual sided adhesive tape. The perimeter ($\rho$) of the tape is determined with a caliper. The impregnated tape is placed in the DCA 315 and lowered and raised in the deionized water at a rate of 159 microns/second for two immersion cycles. The contact angles can be determined from the advancing and receding wetting hysteresis curves of the first immersion cycle.

Chabazite molecular sieves in the subject innovation can be ion exchanged chabazite molecular sieves. Cations of the ion exchanged chabazite molecular sieve can be any suitable metal cation. Examples of metal cations include a transition metal selected from the group consisting of copper, chromium, iron, cobalt, nickel, iridium, cadmium, silver, gold, platinum, manganese, and mixtures thereof. Resulting ion exchanged chabazite molecular sieve can be Cu-exchanged chabazite molecular sieve, Fe-exchanged chabazite molecular sieve, or the like.

The degree of desired ion exchange is not narrowly critical. Chabazite molecular sieves can be exchanged with such a cation to a point at which the exchanged cation represents any suitable ratio of exchanged ions to Al cations. In one embodiment, ion-exchanged chabazite molecular sieve contains about 0.3 exchanged ions to Al atomic ratio or more. In another embodiment, ion-exchanged chabazite molecular sieve contains about 0.6 exchanged ions to Al atomic ratio or more. In yet another embodiment, ion-exchanged chabazite molecular sieve contains about 0.7 exchanged ions to Al atomic ratio or more. In still yet another embodiment, ion-exchanged chabazite molecular sieve contains about 0.8 exchanged ions to Al atomic ratio or more.

The ion-exchanged chabazite molecular sieve can be formed by exchanging cations of a precursor chabazite molecular sieve with other cations. Exchanging cations can be achieved in any suitable technique such as immersion techniques. A precursor chabazite molecular sieve can be immersed into a solution containing soluble salts of metal species. The pH of the solution can be adjusted by addition of ammonium hydroxide, to induce precipitation of the metal cations onto the precursor chabazite molecular sieve. For example, a precursor chabazite molecular sieve is immersed in a solution containing a soluble salt, e.g., copper nitrate, for a time sufficient to allow the incorporation of the copper cations into the precursor chabazite molecular sieve by ion exchange, and then ammonium hydroxide is added to incorporate the copper ions in the solution onto the precursor chabazite molecular sieve by precipitation. The chabazite molecular sieve can then be washed, dried, and calcined.

In one embodiment, chabazite molecular sieve particles in the subject innovation can be finely divided particulate materials. The term "finely divided" when utilized herein means that the particulate materials have a median individual particle size of about 10 microns or less. In one embodiment, chabazite molecular sieve particles have a particle size distribution wherein at least about 90% by weight has a particle size of about 10 microns or less. In another embodiment, chabazite molecular sieve particles have a particle size distribution wherein at least about 90% by weight has a particle size of about 3 microns or less. In yet another embodiment, chabazite molecular sieve particles have a particle size distribution wherein at least about 90% by weight has a particle size of about 1 micron or less.

Other embodiments pertain to SCR catalysts comprising a CuCHA zeolite catalyst having a mole ratio of silica to alumina greater than about 15 and an atomic ratio of copper to aluminum exceeding about 0.25, and exhaust gas treatment systems incorporating CuCHA zeolite catalysts. Still other embodiments pertain to ammonia oxidation (AMOX) catalysts and exhaust gas treatment systems incorporating AMOX catalyst comprising a CuCHA zeolite catalyst having a mole ratio of silica to alumina greater than about 15 and an atomic ratio of copper to aluminum exceeding about 0.25. According to embodiments of the present invention, greater flexibility in locating a catalyst such as an SCR catalyst in an exhaust gas treatment system is provided due to the CuCHA catalysts which exhibit improved hydrothermal stability compared with other types of zeolite materials. Samples having a range of silica to alumina ratio between about 15 and 256 which experience operational temperatures below about 800° C. would be expected to exhibit acceptable low temperature NOx conversion. Thus, according to embodiments of the invention, silica to alumina ratios of about 15 to about 256 are within the scope of the invention, however, narrower ranges having a lower range endpoint of about 10, 20, about 25 and about 30 and a higher range endpoint of 150, 100, 75, 50 and 40 are within the scope of the invention. In one embodiment, the mole ratio of silica to alumina is from about 15 to about 256 and the atomic ratio of copper to aluminum is from about 0.25 to about 0.50. In one embodiment, the mole ratio of silica to alumina is from about 25 to about 40.

The fiber matrix wall flow filter can be coated with a chabazite molecular sieve by any suitable technique. In one embodiment, the fiber matrix wall flow filter is coated with chabazite molecular sieve by immersion techniques. The fiber matrix wall flow filter can be immersed vertically in a portion of a chabazite molecular sieve slurry. The top of the filter can be located just above the surface of the slurry. In this manner slurry contacts the inlet face of each honeycomb wall, but is prevented from contacting the outlet face of each wall. The filter can be left in the slurry for about 30 seconds. The filter can be removed from the slurry, and excess slurry is removed from the filter first by allowing it to drain from the channels, then by blowing with compressed air (against the direction of slurry penetration), and then by pulling a vacuum from the direction of slurry penetration. By using this technique, the catalyst slurry permeates the walls of the filter, yet the pores are not occluded to the extent that undue back pressure will build up in the finished filter. As used herein, the term "permeate" when used to describe the dispersion of the catalyst slurry on the filter, means that the catalyst composition is dispersed throughout the wall of the filter. The resulting fiber matrix wall flow filter containing the chabazite molecular sieve SCR catalyst may be referred to as a SCR filter.

The coated filters can be dried and then calcined. In one embodiment, the coated filter is dried at about 100 degrees Celsius and calcined at a higher temperature of about 300 degrees Celsius or more and about 450 degrees Celsius or less. After calcining, the catalyst loading can be determined by calculation of the coated and uncoated weights of the filter. Catalyst loading can be modified by altering the solids content of the coating slurry. In one embodiment, repeated immersions of the filter in the coating slurry can be conducted, followed by removal of the excess slurry as described above.

The coated filter can have any suitable concentration of chabazite molecular sieve SCR catalyst compositions to ensure that the desired $NO_x$ reduction and particulate removal levels are achieved and/or to secure adequate durability of the catalyst over extended use. In one embodiment, SCR catalyst compositions are deposited on the filter at a concentration of about 1 $g/in^3$ or more and about 3 $g/in^3$ or less. In another embodiment, SCR catalyst compositions are deposited on the filter at a concentration of about 1.2 $g/in^3$ or more and about 2.8 $g/in^3$ or less. In yet another embodiment, SCR catalyst compositions are deposited on the filter at a concentration of about 1.4 $g/in^3$ or more and about 2.6 $g/in^3$ or less. In still yet another embodiment, SCR catalyst compositions are deposited on the filter at a concentration of about 1.5 $g/in^3$ or more and about 2.5 $g/in^3$ or less.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

FIGS. 1A and 1B illustrate a fiber matrix wall flow filter 100 which has a plurality of passages 102. The passages 102 can be tubularly enclosed by the internal walls 104 of the filter substrate. The filter can have an inlet end 106 and an outlet end 108. Alternate passages can be plugged at the inlet end 106 with inlet plugs 110, and at the outlet end 108 with outlet plugs 112 to form opposing checkerboard patterns at the inlet 106 and outlet 108. A gas stream 114 enters through the unplugged channel inlet 116, is stopped by outlet plug 112 and diffuses through porous channel walls 104 to the outlet side 118. The exhaust gas cannot pass directly through the filter without crossing the walls because of inlet plugs 110.

The fiber matrix wall flow filter can be catalyzed in that the wall of filter has thereon or contained therein one or more catalytic materials. Catalytic materials can be present on the inlet side of the element wall alone, the outlet side alone, or both the inlet and outlet sides. The fiber matrix wall flow filter can contain one or more layers of catalytic materials and combinations of one or more layers of catalytic materials on the inlet and/or outlet walls of the element.

FIGS. 2A and 2B are schematic diagrams illustrating systems for treating an exhaust stream containing $NO_x$ and particulate matter. Specifically, FIG. 2A illustrates an exemplary emission treatment system 200A for treating an exhaust stream containing $NO_x$ and particulate matter using a SCR filter. In FIG. 2A, an exhaust 202 containing gaseous pollutants (including unburned hydrocarbons, carbon monoxide, and $NO_x$) and particulate matter is conveyed from an engine 204 to a SCR filter 206. An oxidation catalyst (DOC) 208 can be optionally used between the engine 204 and the SCR filter 206. Although not shown, the system 200A does not include an oxidation catalyst. In the oxidation catalyst 208, unburned gaseous, non-volatile hydrocarbons (e.g., volatile organic fraction (VOF)) and carbon monoxide can be combusted to form carbon dioxide and water. Removal of substantial proportions of the VOF using the oxidation catalyst can help to mitigate a deposition (e.g., clogging) of particulate matter on the SCR filter 206, which is positioned downstream in the system. In one embodiment, a substantial portion of the NO of the $NO_x$ in the exhaust is oxidized to $NO_2$ in the oxidation catalyst.

Ammonia or ammonia precursor (e.g., urea) can be injected as a spray via a nozzle (not shown) into the exhaust stream. In one embodiment, aqueous urea shown on one line 210 serves as an ammonia precursor which can be mixed with air on another line 212 in a mixing device (MD) 214. A valve 216 can be used to meter precise amounts of aqueous urea which are converted in the exhaust stream to ammonia. The exhaust stream with the added ammonia or ammonia precursor is conveyed to the SCR filter 206. In one embodiment, on passing through the SCR filter, the $NO_x$ component is converted to NO by the particulate matter (e.g., soot cake) trapped on the SCR filter, and then NO is converted through the selective catalytic reduction of NO with ammonia to nitrogen.

The particulate matter including the soot fraction and the VOF can be also largely removed by the SCR filter 206. In one embodiment, about 80 wt. % or more of the particulate matter is removed by the SCR filter. In another embodiment, about 85 wt. % or more of the particulate matter is removed by the SCR filter. In yet another embodiment, about 90 wt. % or more of the particulate matter is removed by the SCR filter. The particulate matter deposited on the SCR filter 206 can be combusted through regeneration of the filter.

FIG. 2B illustrates another exemplary emission treatment system 200B for treating an exhaust stream containing $NO_x$ and particulate matter using a SCR filter. In FIG. 2B, the emission treatment system 200B includes a slip oxidation catalyst 218 downstream of a SCR filter 206. The slip oxidation catalyst 218 can contain a composition containing base metals and less than about 0.5 wt % of platinum. The slip oxidation catalyst can be used to oxidize any excess $NH_3$ before it is vented to the atmosphere. An oxidation catalyst 208 can be optionally used between the engine and the SCR filter.

Figure 3:
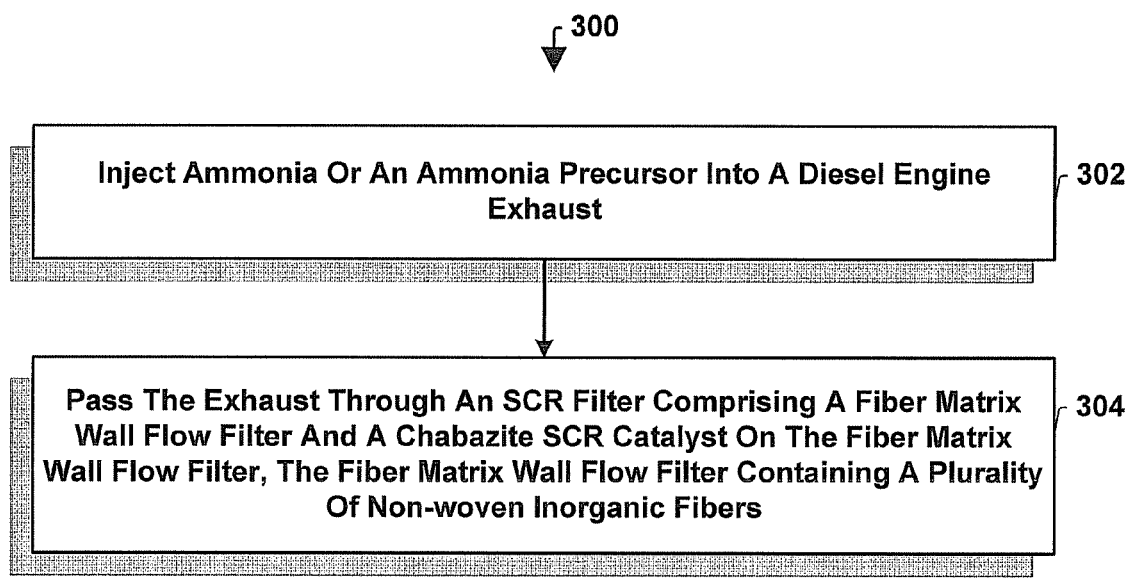
FIG. 3 is a flow diagram of an exemplary methodology for reducing $NO_x$ concentration and particulate matter in a diesel engine exhaust in accordance with one aspect of the specification.

FIG. 3 illustrates an exemplary methodology 300 for reducing $NO_x$ concentration and particulate matter in a diesel engine exhaust. At 302, ammonia or an ammonia precursor is injected into a diesel engine exhaust. At 304, the exhaust is passed through a SCR filter containing a fiber matrix wall flow filter and a chabazite molecular sieve SCR catalyst on the fiber matrix wall flow filter, the fiber matrix wall flow filter containing a plurality of non-woven inorganic fibers. In one embodiment, the method further involves passing the exhaust through an oxidation catalyst before injecting ammonia or ammonia precursor into the exhaust.

Although not shown in FIG. 3, in one embodiment, the fiber matrix wall flow filter contains at least one of alumina fibers, silica fibers, mullite fibers, silicon carbide fibers, aluminosilicate fibers, aluminum borosilicate fibers, or combinations thereof. The fiber matrix wall flow filter can have a coefficient of thermal expansion of about $1\times10^{-6}$/degree Celsius or more and about $6\times10^{-6}$/degree Celsius or less. The fiber matrix wall flow filter can have a modulus of rupture strength of about 1,000 psi or more and about 2,000 psi or less. In another embodiment, the chabazite molecular sieve SCR catalyst comprises hydrophobic chabazite molecular sieve. The chabazite molecular sieve SCR catalyst can contain metal exchanged chabazite molecular sieve. For example, the chabazite molecular sieve SCR catalyst contains at least one of Cu-exchanged chabazite molecular sieve, Fe-exchanged chabazite molecular sieve, or a combination thereof.

The following examples illustrate the subject innovation. Unless otherwise indicated in the following examples and elsewhere in the specification and claims, all parts and percentages are by weight, all temperatures are in degrees Celsius, and pressure is at or near atmospheric pressure.

EXAMPLE 1

Example 1 shows evaluation of a back pressure for coated fiber matrix wall flow filters. A fiber matrix wall flow filter having dimensions of 1×3 inches, an average pore size of 15 microns, and 67% wall porosity is used to prepare a catalyst-coated filter. A catalyst slurry is formed from copper-exchanged 3% chabazite molecular sieve (containing 3 wt. % of copper based on the weight of the chabazite molecular sieve) and de-ionized water.

The catalyst is deposited on the fiber matrix wall flow filter by (1) dipping the filter into the slurry to a depth sufficient to coat the channels of the filter along the entire axial length of the filter from one direction; (2) air-knifing the filter from the side opposite the coating direction (e.g., the dry side); (3) vacuuming the filter from the coated side; and (4) drying the filter at about 93 degrees Celsius for about 1 hour in flowing air, and calcining the filter at about 400 degrees Celsius for about 1 hour. Actions (1) through (4) are then repeated from the opposite side. The resulting fiber matrix wall flow filter is designated as FMWFF. Pressure drop across of the resulting fiber matrix wall flow filters having three different catalyst loadings is shown in Table 1.

Two cordierite ceramic wall flow filters are prepared in the similar manner as comparative examples. The first cordierite ceramic wall flow filter has dimensions of 1×6 inches, an average pore size of 18 microns, and 59% wall porosity. The second cordierite ceramic wall flow filter has dimensions of 1×6 inches, an average pore size of 22 microns, and 65% wall porosity. The first and second cordierite ceramic wall flow filters are designated as CCWFF1 and CCWFF2, respectively. Pressure drop across the cordierite ceramic wall flow filters is shown in Table 1.

TABLE 1

| Filter | Porosity | Increase in Pressure drop after coating (%) |
|---|---|---|
| FMWFF | 67 | 12-16 |
| CCWFF1 | 59 | 36-45 |
| CCWFF2 | 65 | 22 |

The pressure drop increase exhibited by FMWFF is lower than the pressure drop of CCWFF1 and CCWFF2.

EXAMPLE 2

Example 2 shows evaluation of $NO_x$ conversion and $NH_3$ conversion by a coated fiber matrix wall flow filter and as a comparative example, a cordierite ceramic wall flow filter (e.g., a SCR filter). FMWFF and CCWFF2 of Example 1 are used Both of the wall flow filter parts have dimensions of 1×6 inches The SCR catalyst is deposited on both of the cordierite ceramic wall flow filter with a catalyst loading of 2 g/in³ in the manner as described in Example 1. Nitrogen oxides selective catalytic reduction (SCR) efficiency and selectivity of the fresh catalyst cores is measured by adding a feed gas mixture of 500 ppm of NO, 500 ppm of $NH_3$, 10% $O_2$, 5% $H_2O$, balanced with $N_2$ to a steady state reactor containing a 1"D× 3"L catalyst core. The reaction is carried at a space velocity of 40,000 $hr^{-1}$ across a 150° C. to 460° C. temperature range. The resulting NOx conversions are presented in Table 2.

TABLE 2

| NO % conversion | NO2 % conversion | NOx % conversion | NH3 % conversion | N2O make ppm | Outlet Temp degrees C. |
|---|---|---|---|---|---|
| CWFF2 | | | | | |
| 17.5 | 55.1 | 19.3 | 31.4 | 0.25 | 156 |
| 49.9 | 76.6 | 51.2 | 53.1 | 1.06 | 206 |
| 89.1 | 95.7 | 89.4 | 90.4 | 2.34 | 255 |
| 97.6 | 98.6 | 97.7 | 96.7 | 2.18 | 309 |
| 98.9 | 98.6 | 98.9 | 97.8 | 2.39 | 351 |
| FMWFF1 | | | | | |
| 11.4 | 41.8 | 12.7 | 18.2 | 0.11 | 154 |
| 34.1 | 61.2 | 35.2 | 39.0 | 0.44 | 206 |
| 79.7 | 88.7 | 80.0 | 79.0 | 1.39 | 250 |
| 97.0 | 93.1 | 96.8 | 96.0 | 1.24 | 305 |
| 98.8 | 94.3 | 98.6 | 97.1 | 1.08 | 349 |

Thus, it can be seen that there is a general equivalence of the catalytic activity between the two samples.

What has been described above includes examples of the disclosed information. It is, of course, not possible to describe every conceivable combination of components or methodologies for purposes of describing the disclosed information, but one of ordinary skill in the art can recognize that many further combinations and permutations of the disclosed information are possible. Accordingly, the disclosed information is intended to embrace all such alterations, modifications and variations that fall within the spirit and scope of the appended claims. Furthermore, to the extent that the term "includes," "has," "involve," or variants thereof is used in either the detailed description or the claims, such term is intended to be inclusive in a manner similar to the term "comprising" as "comprising" is interpreted when employed as a transitional word in a claim.

What is claimed is:

1. A selective catalytic reduction (SCR) filter, comprising:
    a fiber matrix wall flow filter comprising a plurality of non-woven inorganic fibers; and
    a chabazite molecular sieve SCR catalyst on the fiber matrix wall flow filter.

2. The filter of claim 1, wherein the fiber matrix wall flow filter has a honeycomb structure.

3. The filter of claim 1, wherein the fiber matrix wall flow filter comprises at least one of alumina fibers, silica fibers, mullite fibers, silicon carbide fibers, aluminosilicate fibers, aluminum borosilicate fibers, or combinations thereof.

4. The filter of claim 1, wherein the fiber matrix wall flow filter has a coefficient of thermal expansion from 200 to 800° C. of about $1\times10^{-6}$/degree Celsius or more and about $6\times10^{-6}$/degree Celsius or less.

5. The filter of claim 1, wherein the fiber matrix wall flow filter has a porosity of about 50% or more and about 70% or less.

6. The filter of claim 1, wherein the chabazite molecular sieve SCR catalyst comprises hydrophobic chabazite molecular sieve.

7. The filter of claim 1, wherein the chabazite molecular sieve SCR catalyst comprises metal exchanged chabazite molecular sieve.

8. The filter of claim 1, wherein the chabazite molecular sieve SCR catalyst comprises Cu-exchanged chabazite molecular sieve, Fe-exchanged chabazite molecular sieve, or a combination thereof.

9. The filter of claim 1, wherein The filter of claim 1, wherein the chabazite molecular sieve SCR catalyst comprises Cu-exchanged chabazite molecular sieve having a mole ratio of silica to alumina greater than about 15 and a copper to alumina atomic ratio exceeding about 0.25.

10. The filter of claim 9, wherein mole ratio of silica to alumina is from about 15 to about 256 and the atomic ratio of copper to aluminum is from about 0.25 to about 0.50.

11. The filter of claim 10, wherein the mole ratio of silica to alumina is from about 25 to about 40.

12. The filter of claim 9 wherein the mole ratio of silica to alumina is from about 25 to about 40.

13. An emission treatment system for treating an exhaust stream comprising NOx and particulate matter, comprising:
    an injector that injects ammonia or an ammonia precursor into the exhaust stream; and
    a SCR filter in fluid communication with and downstream of the injector, the SCR filter comprising a fiber matrix wall flow filter and a chabazite molecular sieve SCR catalyst on the fiber matrix wall flow filter, the fiber matrix wall flow filter comprising a plurality of non-woven inorganic fibers.

14. The emission treatment system of claim 13, wherein the fiber matrix wall flow filter comprises at least one of alumina fibers, silica fibers, mullite fibers, silicon carbide fibers, aluminosilicate fibers, aluminum borosilicate fibers, or combinations thereof.

15. The emission treatment system of claim 13, wherein the fiber matrix wall flow filter has a coefficient of thermal expansion from 200 to 800° C. of about $1\times10^{-6}$/degree Celsius or more and about $6\times10^{-6}$/degree Celsius or less.

16. The emission treatment system of claim 13, wherein the fiber matrix wall flow filter has a porosity of about 50% or more and about 70% or less.

17. The emission treatment system of claim 13, wherein the chabazite molecular sieve SCR catalyst comprises hydrophobic chabazite molecular sieve.

18. The emission treatment system of claim 13, wherein the chabazite molecular sieve SCR catalyst comprises metal exchanged chabazite molecular sieve.

19. The emission treatment system of claim 13, wherein the chabazite molecular sieve SCR catalyst comprises Cu-exchanged chabazite molecular sieve, Fe-exchanged chabazite molecular sieve, or a combination thereof.

20. A method of reducing NOx and particulate matter in a diesel engine exhaust, comprising:
injecting ammonia or an ammonia precursor into the diesel engine exhaust; and
passing the exhaust through a SCR filter comprising a fiber matrix wall flow filter and a chabazite molecular sieve SCR catalyst on the fiber matrix wall flow filter, the fiber matrix wall flow filter comprising a plurality of non-woven inorganic fibers.

* * * * *